(12) United States Patent
Hummel et al.

(10) Patent No.: US 11,126,750 B2
(45) Date of Patent: Sep. 21, 2021

(54) MANIPULATION-PROOF STORAGE OF EVIDENCE-RELEVANT DATA

(71) Applicant: VEGA Grieshaber KG, Wolfach (DE)

(72) Inventors: Jakob Hummel, Elzach (DE); Lukas Kopf, Schuttertal (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 16/971,480

(22) PCT Filed: Feb. 4, 2019

(86) PCT No.: PCT/EP2019/052630
§ 371 (c)(1),
(2) Date: Aug. 20, 2020

(87) PCT Pub. No.: WO2019/162072
PCT Pub. Date: Aug. 29, 2019

(65) Prior Publication Data
US 2020/0387639 A1    Dec. 10, 2020

(30) Foreign Application Priority Data

Feb. 23, 2018    (EP) ..................................... 18158375

(51) Int. Cl.
*G06F 21/64*    (2013.01)
*G06F 16/23*    (2019.01)
(Continued)

(52) U.S. Cl.
CPC .......... *G06F 21/64* (2013.01); *G06F 16/2379* (2019.01); *G06F 21/602* (2013.01);
(Continued)

(58) Field of Classification Search
CPC .... G06F 21/64; G06F 16/2379; G06F 21/602; H04L 9/0637; H04L 9/30; H04L 9/3242;
(Continued)

(56) References Cited

U.S. PATENT DOCUMENTS

| | | | |
|---|---|---|---|
| 5,805,711 A  * | 9/1998 | Windel ................... | G06F 21/52 380/2 |
| 2010/0088522 A1* | 4/2010 | Barrus .................. | H04L 9/3242 713/181 |

(Continued)

FOREIGN PATENT DOCUMENTS

| | | |
|---|---|---|
| CN | 104184818 A | 12/2014 |
| CN | 106815530 A | 6/2017 |

(Continued)

OTHER PUBLICATIONS

International Search Report dated Mar. 21, 2019 in PCT/EP2019/052630 filed on Feb. 4, 2019, 2 pages.

(Continued)

*Primary Examiner* — Michael R Vaughan
(74) *Attorney, Agent, or Firm* — Oblon, McClelland, Maier & Neustadt, L.L.P.

(57) ABSTRACT

A method for manipulation-proof storage of payload data is provided, including: storing the payload data in a chain of data records; forming, for each data record in the chain, a current hash value at least using the payload data comprised and stored in the respective data record; storing, in the data record, a predecessor hash value that corresponds to a hash value of a preceding data record, such that in a first data record in the chain, a predetermined root hash value replaces the predecessor hash value; storing, in a persistent memory, a chain of hash values including the current hash value, the predecessor hash value, and the predetermined root hash value, such that content, once stored in the persistent memory, is no longer modifiable or removable from the persistent memory; and storing the data records in a reversible memory that is distinct from the persistent memory.

11 Claims, 4 Drawing Sheets

Figure 1:
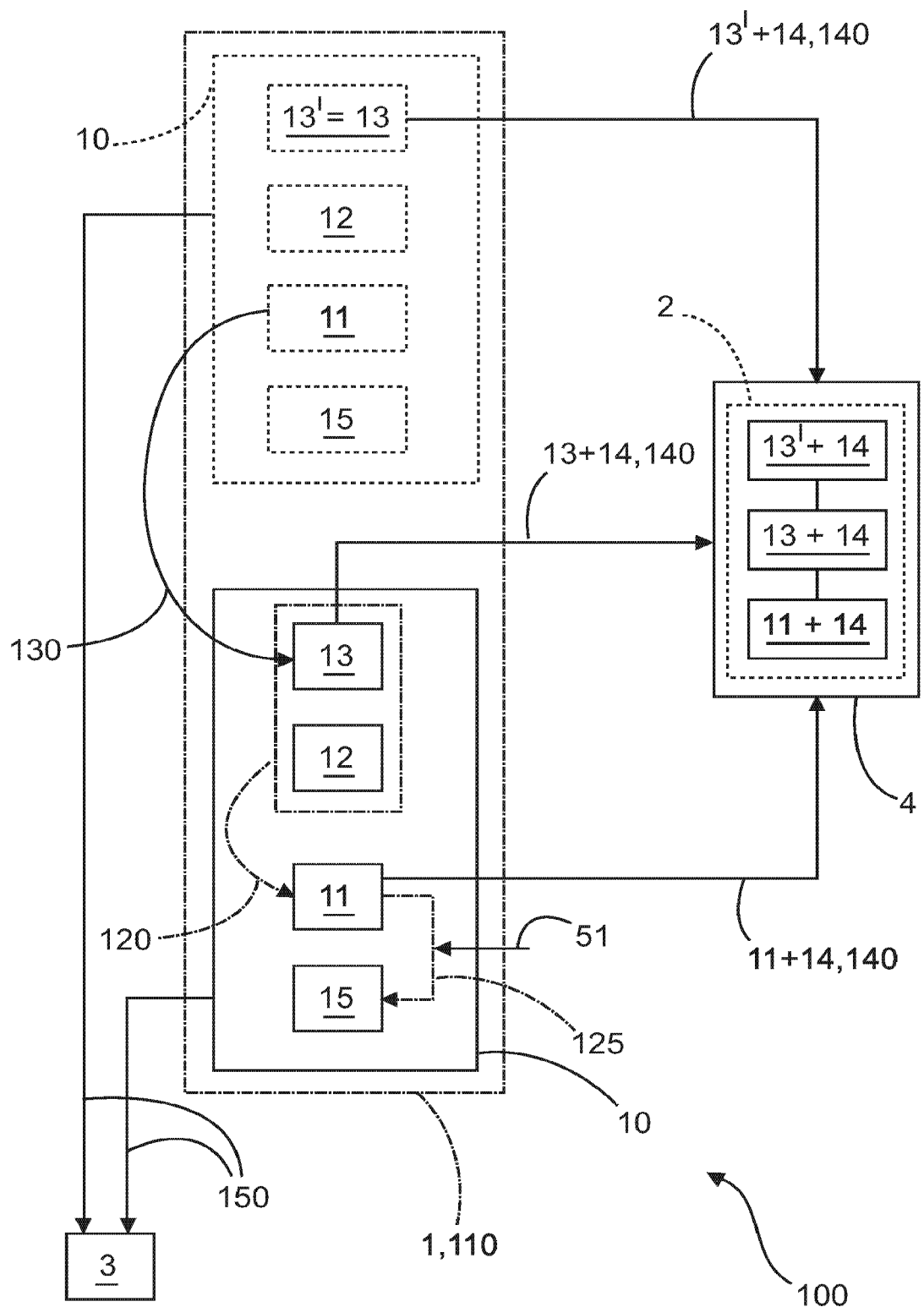

(51) Int. Cl.
*G06F 21/60* (2013.01)
*H04L 9/06* (2006.01)
*H04L 9/30* (2006.01)
*H04L 9/32* (2006.01)

(52) U.S. Cl.
CPC .............. *H04L 9/0637* (2013.01); *H04L 9/30* (2013.01); *H04L 9/3242* (2013.01); *H04L 9/3247* (2013.01); *H04L 9/3297* (2013.01); *H04L 2209/38* (2013.01)

(58) Field of Classification Search
CPC .. H04L 9/3247; H04L 9/3297; H04L 2209/38
See application file for complete search history.

(56) References Cited

U.S. PATENT DOCUMENTS

| | | |
|---|---|---|
| 2014/0025944 A1 | 1/2014 | Maletsky et al. |
| 2017/0109735 A1 | 4/2017 | Sheng et al. |
| 2018/0025365 A1 | 1/2018 | Wilkinson et al. |
| 2019/0035018 A1* | 1/2019 | Nolan ................... H04L 9/0637 |
| 2019/0123580 A1* | 4/2019 | Bindea ................. G05B 13/026 |
| 2019/0340379 A1* | 11/2019 | Beecham ............. G06F 16/9014 |
| 2020/0012634 A1* | 1/2020 | Eberhardt ........... G06F 16/2365 |

FOREIGN PATENT DOCUMENTS

| | | |
|---|---|---|
| CN | 107316239 A | 11/2017 |
| WO | 2018/059855 A1 | 4/2018 |
| WO | 2018/135328 A1 | 7/2018 |

OTHER PUBLICATIONS https://www.modum.io/solutions/; Modum io AG; 2016; [last accessed: Jan. 8, 2021].

Extended European Search Report dated May 4, 2018 in European Patent Application No. 18158375.8 (with English translation), 15 pages.

Chinese Office Action dated May 17, 2021 in corresponding Chinese Patent Application No. 201980014429.7 (with partial English translation) citing documents AO-AR therein, 7 pages.

* cited by examiner

MANIPULATION-PROOF STORAGE OF EVIDENCE-RELEVANT DATA

CROSS-REFERENCE TO RELATED APPLICATIONS

The present application claims the priority of European patent application no. 18 158 375.8, filed on 23 Feb. 2018, which is incorporated by reference into the present document in its entirety.

FIELD OF THE INVENTION

The present invention relates to the storage of evidence-relevant data, particularly sensor data from industrial field devices, that is secured against subsequent forgery or suppression.

BACKGROUND

Capturing data in digital form facilitates handling of the data according to its intended use, but at the same time also facilitates its later manipulation or suppression. Odometers for passenger cars are a prime example. In the past, analog counters were turned backwards, e.g., with a power drill, in order to manipulate the mileage downwards after the fact and gain a fraudulent advantage when selling the car. However, some craftsmanship was required in order not to leave any tell-tale traces. When digital odometers prevailed, a market for so-called "odometer aligners" quickly flourished. The legislative ended this spree in 2005 by adding, into the road traffic law, a new § 22b, which makes the manipulation of odometers as well as the manufacture, procurement and proliferation of corresponding software a criminal offence.

Log files of computer systems are another important example for evidence-relevant data. The information from which IP address an access occurred may be valuable for tracking down attacks on a system. However, once the attacker has privileged access, he also has write access to the log files and can cover his tracks.

OBJECTIVE AND SOLUTION

It is therefore an objective of the present invention to provide a method for storing evidence-relevant data that greatly impedes a later unseen forgery or suppression of the data.

According to the invention, this objective is achieved by a method according to the main claim, delivering and safekeeping devices that are specially suited for carrying out the method according to further dependent claims, as well as a corresponding computer program and computer-readable medium.

DISCLOSURE OF THE INVENTION

Within the frame of the invention, a method for manipulation-proof storage of payload data was developed. Herein, the term "manipulation-proof" is not to be construed limiting in the sense that a manipulation is thwarted physically. Rather, this is to be understood to mean that any manipulation is noticed, so that its original goal, namely deceiving about the content of the payload data, can no longer be achieved.

According to the method, the payload data is stored in a chain of data records. For example, every data record may contain the data that is available at a particular querying point in time.

For every data record, a current hash value is formed at least over the payload data contained in the data record and stored in the data record. By later forming the hash value over the payload data again and comparing with the hash value previously stored in the data record, it can be determined whether the payload data has been manipulated after the fact. If the payload data has been manipulated, the hash values are not identical.

For forming the hash value, any arbitrary hash function (also called "Streuwertfunktion" in German) that maps a record of arbitrary length to a hash value with fixed length may be used. From the abundant supply of hash functions, the person skilled in the art will select, for the respective application, the hash function that affords an optimal trade-off between the expense in hardware and computing time for the computation on the one hand, and the security level on the other hand. In the context of the present invention, the security level of the hash function is determined mainly by the collision resistance, i.e., by the effort that is necessary to find, given a first data record, a second one that is mapped to the same hash value as the first one.

If the used hash function is sufficiently collision-resistant for the respective application, the only way to manipulate the payload data without this being noticed either involves replacing the hash value itself with a hash value that has been newly computed after the manipulation, or involves suppressing the data record altogether, i.e., "making it disappear". In order to impede both manipulations at the same time, in every data record, a predecessor hash value is recorded that corresponds to the current hash value of the previous data record. In the first data record, a predetermined root hash value takes the place of the predecessor hash value. Now, if the current hash value is modified in any given data record or this given data record is removed altogether, this will be noticed by virtue of the chain containing a data record whose current hash value does not match the predecessor hash value of the next data record.

Therefore, the task of storing the payload data in a manipulation-proof manner is reduced to the task of storing the hash values in a manipulation-proof manner.

The chain of hash values is stored in a persistent memory in a manner that a content, once stored in the persistent memory, can no longer be modified or removed from the persistent memory. The data records are stored in a reversible memory that is distinct from the persistent memory.

It was discovered that this sharing of the work between the persistent memory on the one hand and the reversible memory on the other hand makes it practical to use a persistent memory at all for a broad class of applications. Theoretically, one could adopt a simple approach and directly write the payload data into the persistent memory. However, one would hit limits very soon here because, e.g., a physical memory die or a write-once optical storage medium (such as CD-R) has a finite capacity. A continuous effort in terms of human resources and finances would be necessary to replace the respective single-use consumables. By contrast, if only the hash values are stored in the persistent memory, the consumption of persistent memory capacity is decoupled from the amount of to-be-stored payload data. Any arbitrary amount of payload data in a data record is always mapped to a hash value with the same amount.

Thus, only the temporal frequency with which new data records are stored remains as a quantity-driver for the consumption of persistent memory capacity, and the consumption caused by each act of storing is minimal. In this manner, it becomes possible to handle the amount of data accruing in the respective application on the one hand, and getting by with a predetermined budget for the persistent storage, for a broad class of applications. Herein, the temporal frequency to be chosen for the storing of new data records is guided mainly by the requirements of the respective application to which time interval it shall be possible to narrow down any discovered manipulation of the payload data.

Also, the manipulation protection for the payload data is decoupled from the payload data itself in that the content of the persistent memory allows no conclusion as to the payload data itself and therefore does not need to be kept secret. In many applications, there is data that is to be stored in a manipulation-proof manner in order to comply with legal or regulatory documentation requirements, but that also needs to be kept confidential. For example, the measurement values stored in an industrial plant as proof of compliance with environmental requirements allow conclusions as to the production process that is core know-how of the company. Previously, this was an obstacle for hiring external contractors for the manipulation-proof storage. The same applies for personal data for which processing by contractors outside of the EU is tied to strict conditions. By contrast, the hash values may be handed over without qualms.

For example, the operator of an industrial plant may guarantee complete transparency regarding compliance with environmental requirements or documentation requirements with respect to the handling of controlled substances, such as nuclear fuel or narcotics, without having to disclose sensitive internal information, by publishing the chain of hash values in the Federal Gazette or a similar official journal. The payload data itself remains with the operator. If the operator later hands over the payload data for examination upon an official request on a concrete occasion, it can be proved using the chain of hash values that the data was not "fiddled" after the fact by the operator. In this respect, the compression of the information by the forming of the hash values is also important because, e.g., the publication in the Federal Gazette is billed by the number of characters in the document.

Particularly advantageously, at least one of the hash values in the chain is stored in the persistent memory together with a time stamp, and/or the payload data of at least one data record contain a time stamp. In this manner, it may be notarized persistently at which time the respective payload data was being presented. In particular, a "four-eyes rule" may implemented in that the payload data contain a first time stamp and a second time stamp that is stored in the persistent memory together with the hash values is generated by another entity. This impedes manipulations by readjusting clocks.

Also, with time stamps, complete transparency may be achieved as to at which times the capturing of payload data was active. For example, the discharging of an inadmissible amount of pollutants into the environment cannot be disguised by simply turning off the respective measurement instruments for the duration of this discharging. The turning off itself may be possible (e.g., by unplugging the power or network cable), but it will show in irregularities in the time stamps and cause a corresponding inquiry.

In a further particularly advantageous embodiment, for at least one data record, the payload data, and/or the current hash value, of this data record is signed with a private cryptographic key, and this signature is incorporated into the data record. By checking the signature with the corresponding public key, it may be ensured that the payload data was not manipulated in the time interval between its generation and the storing of the corresponding hash value in the persistent memory.

This is particularly advantageous for applications in which the storing of the hash values in the persistent memory is not performed by the same entity that has originally created the data record.

For example, in a particularly advantageous embodiment, the data record may be created by a first, delivering device, while the storing of the hash values in the persistent memory is performed by a second, safekeeping device. Herein, in particular, the signing of the data records may be performed by the delivering device as well.

This sharing of the work between the delivering device and the safekeeping device is advantageous in particular for the capturing of measurement data in industrial plants. Here, the capturing itself is frequently performed by field devices that are neither equipped with a persistent memory nor may access such a persistent memory on their own over a network. Rather, field devices as delivering devices are frequently connected to superordinate devices (controllers) via a network connection with low bandwidth, such as a two-conductor line or a LoRaWAN radio link. Because there are usually many more field devices in the industrial plant than there are superordinate devices, these superordinate devices are equipped with a higher-grade hardware and network connection. This hardware and network connection may be used so that such a superordinate device may serve as safekeeping device.

Herein, the signature created by the delivering device ensures that the payload data may be manipulated neither during the transmission to the safekeeping device or on the safekeeping device itself without being noticed. For this signature, only little additional bandwidth is required on the network connection to the safekeeping device.

Particularly advantageously, the current hash value is formed at least over a combination of the payload data and the predecessor hash value. In this manner, a manipulation of the predecessor hash value in a data record may be noticed given only this one data record without having to consult the previous data record for checking the predecessor hash value. In particular, attempts to suppress a previous data record altogether ("make it disappear") are noticed early.

In a further particularly advantageous embodiment, the safekeeping device transmits the predecessor hash value to the delivering device via a bidirectional communications link. Using this predecessor hash value, the delivering device creates the next data record and transmits this to the safekeeping device. In this manner, it is not necessary for the delivering device to remember, after creating each data record, the just-created current hash value until the next data record is created, in order to use it then as predecessor hash value. In particular, if the delivering device is not supplied with power continuously, it is not necessary to continuously update the current hash value in a non-volatile memory with a possibly limited number of write cycles. Also, the safekeeping device is enabled to combine data records from multiple delivering devise in one single chain. For example, the safekeeping device may contact the delivering devices in a round-robin manner to query each one for a current data record.

Particularly advantageously, a field device that stands in a direct relationship with an industrial production process is chosen as delivering device. The payload data then comprises measurement values of at least one sensor that is comprised in the field device or connected to the field device. A very high number of these field devices is usually present in an industrial plant, and for reasons of cost savings, they are not equipped with more hardware than absolutely necessary. The most important functionality of the method, namely the splitting of the data keeping into a persistent memory for the hash values on the one hand and a reversible memory for the payload data on the other hands, may be realized and directed by the safekeeping device alone without any modifications to the delivering device.

In a particularly advantageous embodiment, a memory whose physical writing process is irreversible is chosen as persistent memory. For example, this may be a OTP-ROM (One Time Programmable-ROM), or an optical recording medium with a layer into which written bits are burned by a laser beam (such as CD-R or DVD-R). The history of hash values then may no longer be changed unseen after the fact. At the most, it may be attempted to swap the memory for a new one. However, with suitable physical countermeasures, it may be ensured that such a swap is not possible without being noticed. For example, the memory may be equipped with an immutable serial number that may be queried. The memory may also, for instance, be mounted so rigidly that its removal inevitably leaves traces, and/or the place where it is mounted may only be accessible after breaking a seal or a seal with leads.

As described before, the capacity of the memory then is a finite, non-renewable resource. However, because only the hash values and optionally the time stamps needs to be stored there, its capacity may be dimensioned such that it is sufficient for the projected duration of operation.

In a further particularly advantageous embodiment, a distributed blockchain memory whose content is updated by a consensus of a multitude of participants is chosen as persistent memory. Such a memory is particularly resistant against removal of the history of hash values after the fact. To this end, in particular, a public blockchain may be used, such as a blockchain that administers Ethereum or a cryptocurrency derived from that. The history of hash values is then distributed to all nodes of the blockchain worldwide.

Also, the memory in the blockchain is no finite resource, so that the method may be continued for any length of time without a physical memory capacity dwindling.

However, for two reasons, it would not be practical for most applications to store the payload data itself in a public blockchain, instead of the chain of hash values.

Because the occupied storage space in the blockchain is occupied on every node of the blockchain worldwide, it is no finite resource, but has to be paid for dearly in the respective cryptocurrency. At present, the persistent storage in the Ethereum blockchain costs on the order of one euro-cent per byte, which is roughly comparable to the costs due for a publication in the electronic Federal Gazette.

Also, most payload data is confidential information that must not be published. In principle, the blockchain might be repurposed for storing sensitive information by protecting the data with encryption. However, the confidentiality is then dependent on the key, which can never be changed again, never falls into the wrong hands. Every handing over of the data, and thus of the key, would then be linked to the risk that the key is proliferated outside of the circle of authorized persons and the data become public after all, which could never be undone again.

By contrast, if only the hash values become public, it is impossible to uniquely reconstruct the original data because hash functions are not injective. However, every authorized person to whom the original data have been communicated in a secure manner has the opportunity to check for correctness and completeness using the chain of hash values stored in the blockchain.

In this respect, it is noted that the term "chain of hash values" is not limited in that the hash values must be stored in consecutive blocks in the blockchain. In particular, in a public blockchain, it is frequently only possible to present data for storage without any guarantee in which of the next blocks this storing is actually performed. Among other things, the order of the storage depends on how much cryptocurrency each participant who has presented data for storing has offered for the storing. In the blockchain, the hash values may be chained across block boundaries, e.g., by adding, to each hash value, a pointer to a preceding and/or succeeding hash value.

Industrial field devices as delivering devices in connection with superordinate devices (controllers) as delivering devices are an important exemplary application of the method. However, the method is not limited to this. Rather, it is applicable very broadly, such as in the examples of odometers and log files mentioned in the beginning.

The application in the vehicle may be upgraded by a great deal compared with the storing of only the mileage. Because the hash values always have the same size independently of the volume of the data secured with them, very detailed data about the vehicle usage may be recorded in the vehicle and protected against manipulation. Because the data itself does not have to leave the vehicle, there are no limitations with respect to privacy. For example, very detailed indicators may be stored that allow a conclusion how nicely the vehicle was treated at large. For example, it may be registered whether more short trips or more long journeys were made and whether they were made at higher or lower engine speeds. Also, for instance, the environmental conditions may be captured to capture whether the vehicle is predominantly parked in garages or exposed to the elements without protection all the time.

The vehicle user may freely decide which information he discloses, and the authenticity and completeness of this information is then ensured by means of the persistently stored hash values. To facilitate the selective disclosure of only certain kinds of information, separate chains of data records and hash values may be maintained. For example, the data may be grouped into different levels depending on the degree to which they allow conclusions as to the personal behavior of the driver and are thus sensitive, and for every level, separate chains may be maintained. The vehicle user may then also, for example, decide at any time to delete all or part of the payload data in certain chains, e.g., to prevent a leaking of information when turning the vehicle over to another person. This harms neither the continued updating of the chains nor the checking of the payload data that has not been deleted. The persistent history of the hash values will only continue to disclose that in a certain time frame, payload data once was present.

In an analogous manner, when storing log files in a manipulation-proof manner, it may also be advantageous to split the entries into different chains depending on the degree to which they refer to persons, depending on the affected subsystem, and/or depending on the severity of the reported problem.

Also, for example, cold chains or other transport conditions, such as vibrations or entrance of light upon unauthorized opening of a container, may be monitored by storing the measurement values of respective sensors in a manipulation-proof manner according to the method. In particular, it is made much more difficult to suppress information that is indicative of certain prescribed conditions not being adhered to within a certain time frame after the fact. A time-stamped history of hash values unequivocally proves that the measurement was active in the time frame in question. A temporal gap in this history without a plausible cause may be construed as a manipulation attempt, and acceptance of the delivered goods may be refused.

Health data is a further exemplary application. For example, if blood parameters, results of a body analysis scale or other parameters are regularly captured, the patient may be tempted to "forget" bad results in a certain period to avoid premium supplements for elevated risk with his private health insurer. If the method disclosed here is applied, the existence of a data record may no longer be denied. Rather than suing in court for the return of fraudulently obtained insurance payments, the insurer may police the obligation of a prospective client to disclose his prior history completely and truthfully with technical means from the beginning and respond to attempted fraud by refusing the application for insurance in the first place.

Preventing tax fraud is another exemplary application. For example, the method may be used to implement the use of manipulation-proof cash registers that is planned to be made compulsory from the beginning of January 2020. Also, measurement data that allows a conclusion as to the actually produced quantity of excise-taxable goods may be protected from manipulation and yet entirely remain within the company.

The application for industrial field devices described before contains the generatl teaching that it is advantageous to couple a delivering device that captures payload data, forms a hash value over this and signs the payload data with a safekeeping device that checks the signature and, upon a positive outcome of the check, stores the payload data in a manipulation-proof manner.

Therefore, the invention also relates to a safekeeping device equipped to this effect. This safekeeping device comprises at least a first interface that is connectable to a field device that stands in direct relationship to an industrial production process. Also, the safekeeping device comprises a second interface that is connectable to a reversible memory, as well as a logic unit.

The second interface may be an arbitrary controller for connecting an internal or external memory device over, for example, USB, IDE, SATA, IEEE 1394, SCSI or another standard. But the second interface may, for example, also be a network interface for the saving of data in a cloud.

The logic unit is configured to accept at least one data record from the delivering device, check a cryptographic signature comprised in the data record with a public key associated with the delivering device, and transmit the data record to the reversible storage upon a positive outcome of the check.

In this manner, a fair amount of hardware may be saved, in particular if multiple delivering devices are assigned to one safekeeping device. On the one hand, not every delivering device needs a rather complex controller for accessing the reversible memory. On the other hand, due to the security conferred by the signature, the data connection between the delivering device and the safekeeping device may be realized in a simple manner and does not need to be secured against manipulation per se.

Particularly advantageously, in this respect, the first interface is configured as a two-conductor line or as a radio interface that is limited to a transmit duty cycle of at most 10%. These interfaces provide shared media over which very many delivering device may be connected, e.g., in a bus topology. On the other hand, a shared medium is particularly vulnerable to manipulation of the transmitted data. This vulnerability is compensated for by checking of the signature.

In a further particularly advantageous embodiment, a third interface that is connectable to a persistent memory is additionally provided. The logic unit is then further configured to retrieve predecessor hash values from the persistent memory and transmit them to the delivering device, and store current hash values from data records obtained from the delivering device in the persistent memory. The safekeeping device may then maintain a history of the hash values in the persistent memory according to the method described before. In particular, by transmitting the predecessor hash values, the safekeeping device may control the order in which data is retrieved from a multitude of connected delivering device and combined in one or more chains of data records.

In a further particularly advantageous embodiment, the third interface is configured as a client that is able to integrate the safekeeping device as a fully enabled participant into a blockchain network serving as persistent memory. In particular, if this is a public blockchain, it is advantageous to expend the required effort only once on the safekeeping device, rather than separately on each of the delivering devices connected to it. For example, much storage space and a fast network connection are required to store a complete copy of the blockchain locally and keep it up to date. Also, it is advantageous in a security aspect to make the contact with a blockchain on the internet from the safekeeping device, rather than immediately from the delivering device. In case the data obtained from the public blockchain cause a system crash or even a hostile takeover of the safekeeping device, this safekeeping device may be aided by a rudimentary emergency controller to which the delivering devices are also connected. In particular, this emergency controller may be isolated from the Internet and still allow at least a basic operation of field devices connected to it. By contrast, it is not possible at reasonable expense to configure each individual field device with corresponding redundancy. Depending on the importance of the field device that has been stymied by data received from the blockchain, the further operation of the production process as a whole may be in jeopardy.

In accordance with what was described before, the invention also relates to a delivering device. This delivering device comprises a memory for a private cryptographic key, a first interface that is connectable to a safekeeping device, a sensor and/or a second interface that is connectable to a sensor, as well as a logic unit.

The logic unit is configured to capture measurement values of one or more sensors as payload data, optionally combine them with a predecessor hash value obtained from the safekeeping device, and form a current hash value over the payload data, respectively over the combination of the payload data with the predecessor hash value. The logic unit is further configured to form a signature of the current hash value using the private cryptographic key, combine the payload data, the current hash value, the signature and optionally the predecessor hash value into a data record, and transmit this to the safekeeping device.

In this manner, the delivering device establishes the prerequisites so that the safekeeping device may perform the manipulation-proof storing by means of reversible storing of the data records and persistent storing of the hash values. In particular, in a system with many delivering devices and one safekeeping device, it is advantageous to decentralize the task to form hash values over the payload data on the delivering devices. This task is simple enough such that every delivering device may perform it with the relatively limited resources of its logic unit. On the other hand, the effort to process all payload data from a multitude of delivering devices would be a noticeable burden for the safekeeping device.

In particular, the delivering device may be configured as a fill level gauge, a limit level gauge, a density meter, a flow meter or a pressure gauge. Measurement data from these types of devices is particularly frequently relevant for the gapless, manipulation-proof documentation of the conducting of industrial processes.

The functionality described above may in particular be implemented wholly or partially in software. In particular, this software may be sold as an update or upgrade for existing embedded systems in delivering devices and safekeeping devices, but also as an OEM product for manufacturers of delivering and/or safekeeping devices. It is therefore a product of its own. The invention therefore also relates to a computer program with machine readable instructions that, when executed on a computer or on an embedded system, upgrade the computer, respectively the embedded system, to a safekeeping and/or delivering device according to the invention, and/or cause the computer, respectively the embedded system, to perform the method according to the invention. Just as well, the invention relates to a computer readable medium or a download product with the computer program.

SPECIAL PART OF THE DESCRIPTION

Figure 2:
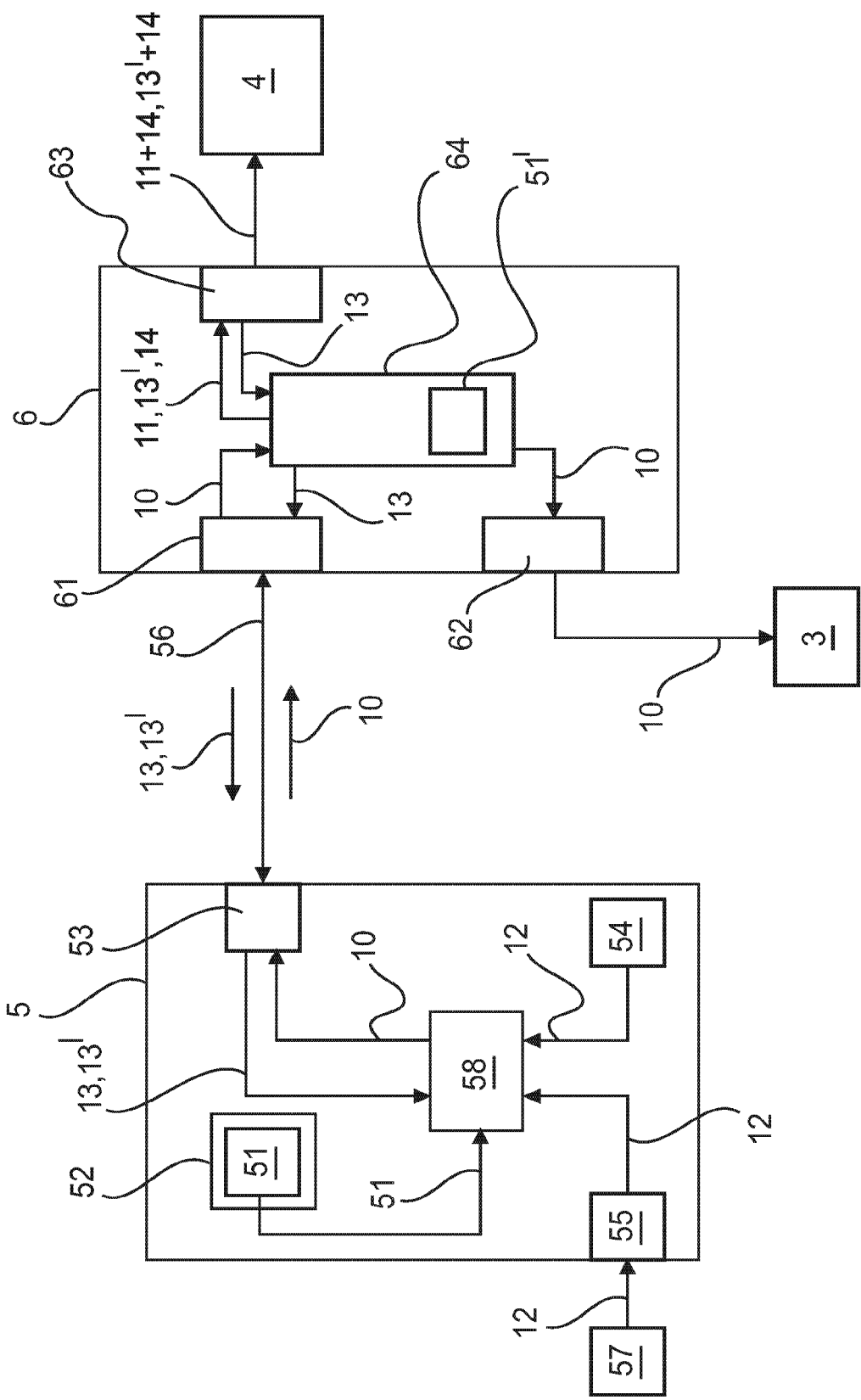
Figure 3:
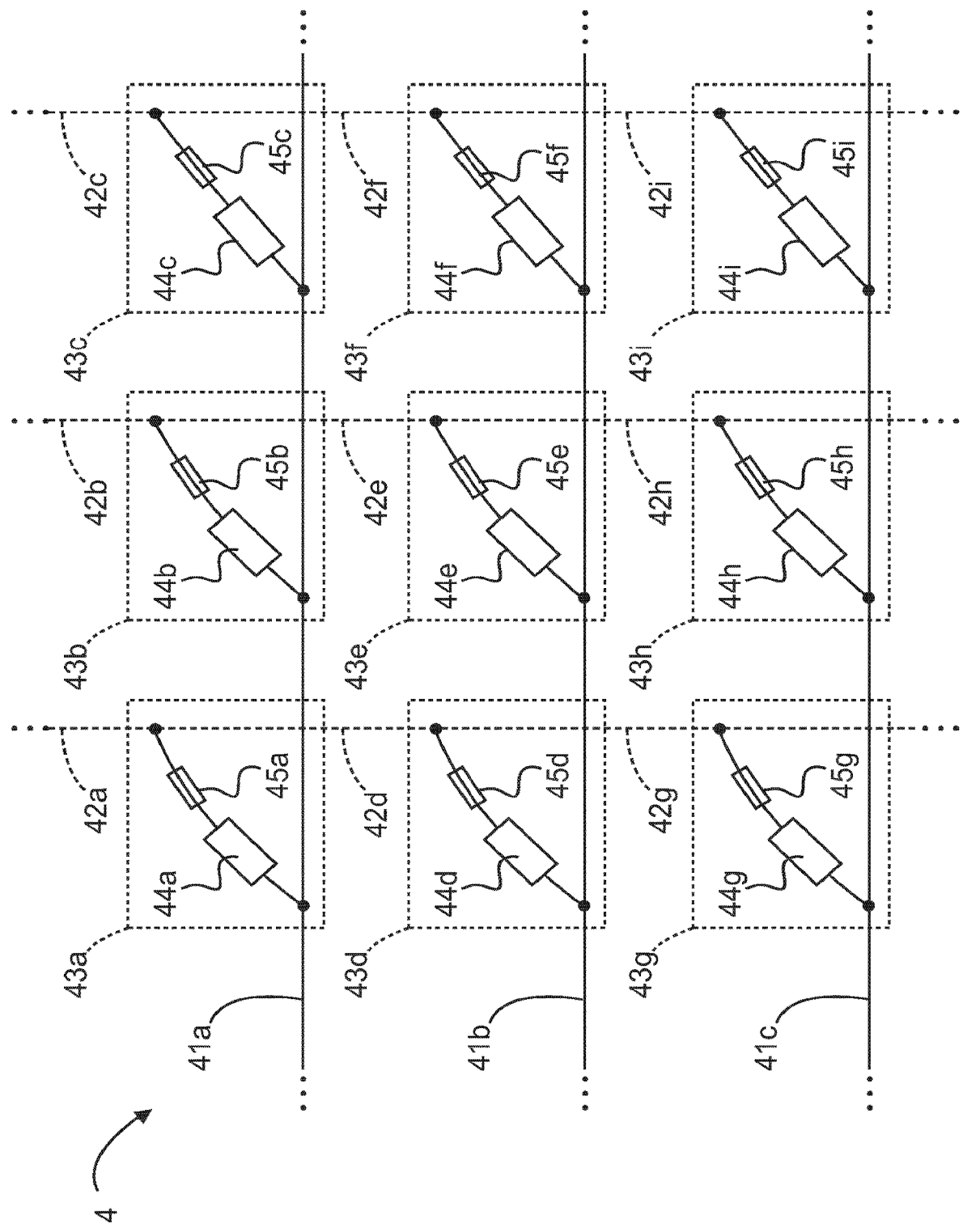
Figure 4:
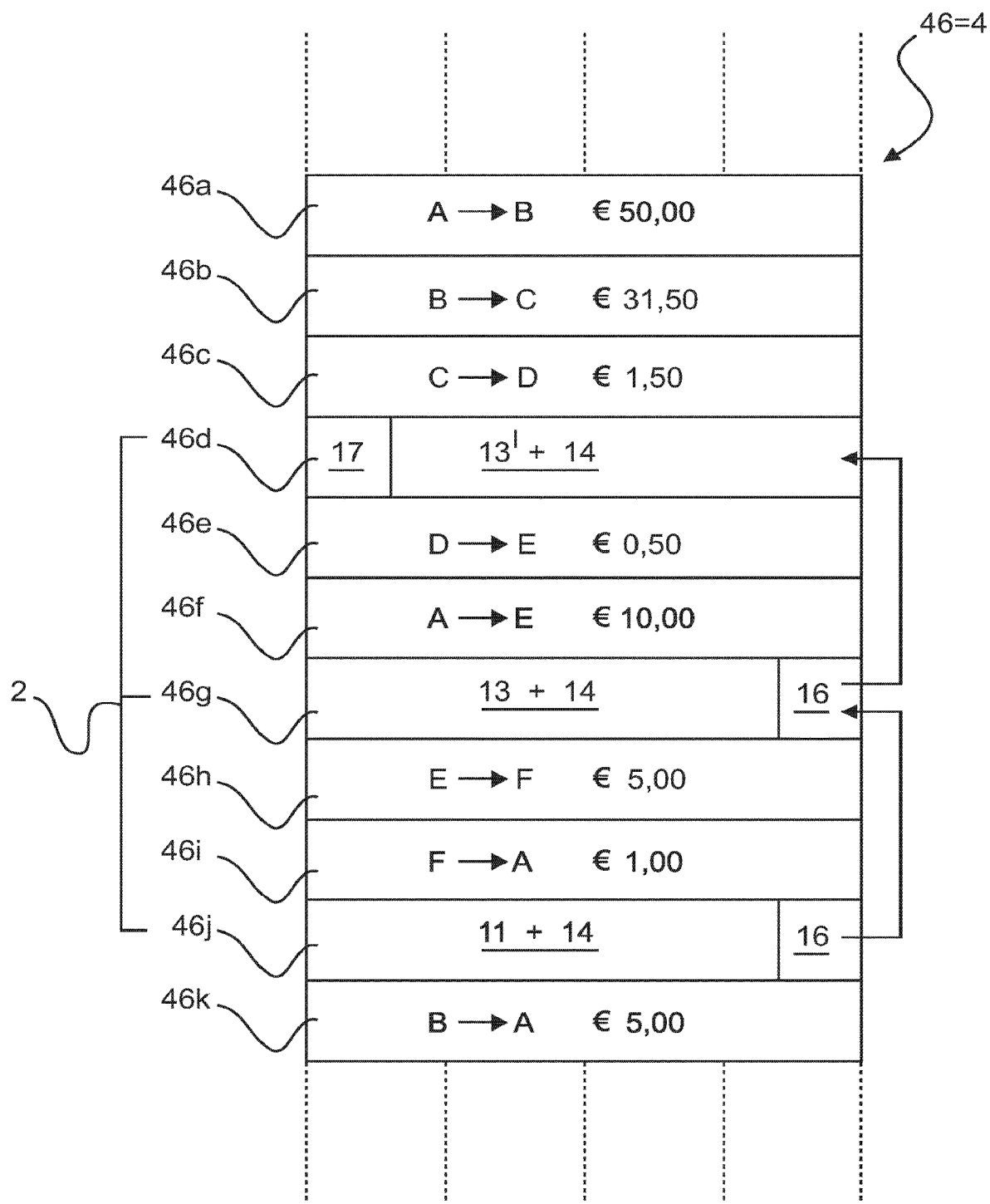

In the following, the subject-matter of the invention is illustrated using Figures without thereby limiting the subject-matter of the invention. It is shown:

FIG. 1: Exemplary embodiment of the method 100;
FIG. 2: Exemplary interaction of delivering device 5 and safekeeping device 6;
FIG. 3: Example of a memory 4 that is writable in a physically irreversible manner;
FIG. 4: Exemplary integration of a public blockchain 46 as persistent memory 4.

According to FIG. 1, according to step 110, the payload data 12 is stored in a chain 1 of data records 10, of which only two are shown here exemplarily. Each of these data records 10 contains a predecessor hash value 13 that has been obtained according to step 130 from the preceding data record 10 and serves as current hash value 11 there. The data record 10 further comprises payload data 12, a current hash value 11 that has been formed according to step 120 from the combination of the payload data 12 and the predecessor hash value 13, as well as a cryptographic signature 15 of the current hash value 11 that has been formed according to step 125 with a private key 51. The first data record 10 differs from all subsequent data records in that the predetermined root hash value 13' takes the place of the predecessor hash value 13.

According to step 140, each of the hash values 13', 13, 11 is affixed with an associated time stamp 14 and stored in a persistent memory 4 in a chain 2. The data records 10 themselves, which form the chain 1, are stored in a reversible memory 3 according to step 150.

The numerical reference signs of the steps of the method 100 are not to be construed limiting in the sense that their numeric order dictates the order in which the steps have to be performed.

The salient effect of the method described before, namely that arbitrary amounts of payload data 12 are protected from manipulation with minimal consumption of persistent memory 4 and may therefore be stored in a reversible memory 3 (such as a hard drive or a cloud) without loss of integrity, is independent of which entities perform the respective individual steps. For example, one and the same industrial field device as delivering device 5 may perform the whole method 100. Just as well, the field device as delivering device 5 may send payload data 12 to a safekeeping device 6 where the method 100 is performed in its entirety. In between, any arbitrary sharing of the work between the delivering device 5 and the safekeeping device 6 is conceivable.

FIG. 2 shows one schematic example of such a sharing of work between a delivering device 5 and a safekeeping device 6. In the scenario shown in FIG. 2, the delivering device 5 has a memory 52 that, in operation, contains a private cryptographic key 51. A first interface 53 for communication with a safekeeping device 6 is provided. The delivering device 5 further has a first sensor 54, as well as a second interface 55 that is connectable to a second sensor 57.

The sensors 54 and 57 deliver payload data 12 to the logic unit 58 of the delivering device 5. In the logic unit 58, the payload data 12 is combined with predecessor hash values 53, 53' obtained over the first interface 53 and the bidirectional communications link 56 from the safekeeping device 6, and current hash values 11 are formed. The current hash values 11, which are not shown again in FIG. 2, are combined into data records 10 together with the payload data 12, the predecessor hash values 13', 13, and the signature 15 that is also not shown again in FIG. 2. The data records 10 are sent to the safekeeping device over the first interface 53 and the bidirectional communications link 56. In particular, the connection 56 may be a two-conductor line, a radio link with a limited transmit duty cycle, or another narrow-banded channel.

In the scenario shown in FIG. 2, a multitude of field devices as delivering devices 5 is assigned to one safekeeping device 6 that is configured as a controller for field devices here. For illustration, only one of those delivering devices 5 is exemplarily shown.

The safekeeping device 6 is equipped with much stringer hardware than the delivering device 5. Besides a first interface 61 for the communication with the delivering device 5, the safekeeping device also has a second interface 62 that is connected to the reversible memory 3. Furthermore, a third interface 63, which is connected to the persistent memory 4, is provided.

The safekeeping device 6 comprises a logic unit 64 that checks, for data records 10 obtained from the delivering device 5, using a public key 51' corresponding to the private key 51 of the delivering device 5, whether they carry a correct signature 15. If this is the case, the data records 10 are stored in the reversible memory 3.

Furthermore, the logic unit 64 of the safekeeping device 6 also stored the current hash values 11 taken from the data records 10 in the persistent memory 4, each affixed with a current time stamp 14. A root hash value 13' generated by the safekeeping device is also stored in the persistent memory 4 with a corresponding time stamp 14.

Conversely, predecessor hash values 13 are retrieved from the persistent memory and transmitted to the delivering device 5, so as to request transmission of a new data record 10. In this manner, in particular, a multitude of delivering devices 5 may be queried in a round-robin manner, so that the current hash values 11 corresponding to the respective data records 10 may subsequently be collected in one and the same persistent memory 4.

FIG. 3 shows an example of a persistent memory 4 that is physically configured to be written in an irreversible manner. Each of the nine memory cells 43a-43i that are exemplarily shown in FIG. 3 comprises a series connection of a resistor 44a-44i and a fuse 45a-45i. This series connection connects exactly one of the word lines 41a-41c to exactly one of the bit lines 42a-42c. Here, the word lines 41a-41c run within the plane of projection, and the bit lines 42a-42c run in a plane behind the plane of projection.

If a reading voltage is applied to a memory cell 43a-43i via the associated combination of word line 41a-41c and bit line 42a-42c, a detectable current flows (logical 1) if the respective fuse 45a-45i is intact. However, if the fuse 45a-45i has blown, no current flows (logical 0).

By applying a higher write voltage to the memory cell 43a-43i, a sufficiently high current may be driven through the respective fuse 45a-45i such that this will blow. In this manner, the memory cell 43a-43i may be switched irreversibly from a logical 1 to a logical 0. A memory 4 of this kind is a finite resource. Therefore, it is particularly advantageous that the method described before is very economical in terms of usage of the persistent memory 4, regardless of the volume of the payload data to be protected against manipulation.

FIG. 4 shows an example of the use of a public Ethereum-based blockchain 46 as a persistent memory 4. Of the blocks contained in the blockchain 46, which are chained together by hashes, eleven blocks 46a-46k are exemplarily shown. For the sake of clarity, in the blocks 46a-46k, only the respective payload data is shown. Hashes and other internal information of the blockchain protocol have been omitted.

The first three blocks 46a-46c comprise monetary transactions between four participants A-D. The fourth block 46d comprises a header 17 that indicates that this block 46d is the beginning of a chain 2 of hash values 13', 13, 11 that is formed according to the method described before. Furthermore, the block 46d comprises the root hash value 13' belonging to the chain 2, as well as an associated time stamp 14. Optionally, the header 17 may be omitted.

Block 46d is again succeeded by two blocks 46e, 46f with monetary transactions between participants A, D and E. Block 46g contains the next hash value 13 of the chain 2, as well as a corresponding time stamp 14. In addition, block 46g further comprises a pointer 16 to block 46d. The fact that such a pointer is missing in block 46d allows the conclusion that this block is the beginning of the chain 2; therefore, the header 17 may be omitted in block 46d.

Block 46g is again succeeded by two further blocks 46h, 46i with monetary transactions between participants A, E and F. Block 46j is again assigned to the chain 2 and contains the current hash value 11 together with corresponding time stamp 14, as well as a pointer 16 to block 46g that comprises the previous hash value 13 of the chain 2. The next block 46k again comprises a monetary transaction between participants A and B.

The blockchain 46 is configured to be continued virtually indefinitely, so that it will always be possible to conduct transactions in the associated cryptocurrency. Therefore, the available memory in the blockchain 46 does not hit a principal limit. However, the appending of new blocks to the blockchain 46 must be confirmed by a consensus of the participants that mine the cryptocurrency (miners). This consensus costs effort in the form of "Proof of Stake" or "Proof of Work". For this effort, the miners charge a fee ("mining fee") that typically depends on the amount of information to be appended to the blockchain. Mostly, the miners also prioritize the to-be-appended information according to the respective offered amounts of mining fee. Therefore, memory in a public blockchain 46 that is used as persistent memory 4 is no finite resource, but it is expensive.

Irrespective of the type of persistent memory 4 that is used, a given data record 10 obtained from any arbitrary source may be checked for authenticity very easily. If the current hash value 11 and the predecessor hash value 13 match the respective values stored in the persistent memory 4, the forming of a hash over the data (such as predecessor hash value 13 and payload data 12) that has nominally gone into the current hash value leads to the correct current hash value 11, and the digital signature 15 of the data record 10 is valid, then it is ensured that the payload data 12 in the data record was obtained in a time frame between the time stamp 14 of the predecessor hash value 13 and the time stamp 14 of the current hash value 11, the payload data 12 has not been modified any more since, and the payload data 12 originate from the delivering device 5 that possesses the private key 51.

LIST OF REFERENCE SIGNS

1 chain of data records 10
10 data record
11 current hash value in data record 10
12 payload data in data record 10
13 predecessor hash value in data record 10
13' root hash value in first data record 10
14 time stamp
15 signature
16 pointer to previous hash value 13', 13
17 header at beginning of chain 2
2 chain of hash values 13', 13, 11
3 reversible memory
4 persistent memory
41a-41c word lines of physical persistent memory 4
42a-42c bit lines of physical persistent memory 4
43a-43i memory cells of physical persistent memory 4
44a-44i resistors in memory cells 43a-43i
45a-45i fuses in memory cells 43a-43i
46 blockchain as persistent memory 4
46a-46k blocks in blockchain 46
5 delivering device
51 private key of delivering device 5
51' public key, corresponds to private key 51
52 memory for private key 51
53 first interface to safekeeping device 6
54 sensor in delivering device 5
55 second interface to sensor 57
56 communications link to safekeeping device 6
57 sensor, connected to second interface 55
58 logic unit in delivering device 5
6 safekeeping device 61 first interface to delivering device 5
62 second interface to reversible memory 3
63 third interface to persistent memory 4
64 logic unit in safekeeping device 6
100 method
110 storing data records 10 in chain 1
120 storing current hash value 11 in data record 10
125 forming signature 15 and storing in data record 10
130 storing predecessor hash value 13 in data record 10
140 storing chain 2 of hash values in persistent memory 4
150 storing data records 10 in reversible memory 3

The invention claimed is:

1. A method for manipulation-proof storage of payload data, comprising:
storing the payload data in a chain of data records;
forming, for each data record in the chain, a current hash value at least using the payload data comprised in the respective data record, and storing the current hash value in the respective data record;
storing, in said each data record, a predecessor hash value that corresponds to a hash value of a preceding data record, wherein, in a first data record in the chain, a predetermined root hash value replaces the predecessor hash value;
storing, in a persistent memory, a chain of hash values including the current hash value, the predecessor hash value, and the predetermined root hash value, such that content, once stored in the persistent memory, is no longer modifiable or removable from the persistent memory after the fact and that the content of the persistent memory allows no conclusion as to the payload data itself; and
storing the data records in a reversible memory that is distinct from the persistent memory,
wherein the data records are created by a first delivering device,
wherein the storing of the chain of hash values in the persistent memory is performed by a second safekeeping device,
wherein the first delivering device is a field device disposed in a direct relationship with an industrial production process,
wherein the payload data comprises measurement values of at least one sensor that is disposed in the field device or is connected to the field device, and
wherein the delivering device is a fill level gauge, a limit level gauge, a density meter, a flow meter, or a pressure gauge.

2. The method according to claim 1, wherein at least one of the hash values in the chain of hash values is stored in the chain together with a time stamp, and/or the payload data of at least one data record comprises a time stamp.

3. The method according to claim 1, wherein, for at least one data record, the payload data and/or a current hash value of the at least one data record are signed with a private cryptographic key, and a signature is incorporated into the at least one data record.

4. The method according to claim 1, wherein the current hash value is formed at least over a combination of the payload data and the predecessor hash value.

5. The method according to claim 1,
wherein the second safekeeping device transmits the predecessor hash value to the first delivering device over a bidirectional communications link, and
wherein the first delivering device creates a respective next data record using the predecessor hash value and transmits the respective next data record to the second safekeeping device.

6. The method according to claim 1, wherein the persistent memory is a memory having an irreversible physical writing process.

7. The method according to claim 1, wherein the persistent memory is a distributed blockchain memory in which content is updated by a consensus of a plurality of participants.

8. A non-transitory computer-readable storage medium having machine-readable instructions stored therein, which, when executed on a computer or on an embedded system, upgrades the computer or the embedded system to a safekeeping device and/or a delivering device, and instructs the safekeeping device and/or the delivering device to perform the method according to claim 1.

9. A system for manipulation-proof storage of payload data, the system comprising a safekeeping device and a delivering device,
the safekeeping device comprising:
a first interface configured to connect to a field device as the delivering device, wherein the field device is disposed in a direct relationship with an industrial production process;
a second interface configured to connect to a reversible memory;
a third interface configured to connect to a persistent memory, wherein content, once stored in the persistent memory, can neither be changed nor removed from the persistent memory after the fact and the content of the persistent memory allows no conclusion as to the payload data itself; and
a first logic circuit configured to:
receive at least one data record from the delivering device, wherein payload data in this record comprises measurement values of at least one sensor that is comprised in the field device or connected to the field device,
verify a cryptographic signature comprised in the at least one data record with a public key associated with the delivering device, and
transmit the at least one data record to the reversible memory upon a positive outcome of the verification,
retrieve predecessor hash values from the persistent memory and transmit the retrieved predecessor hash values to the delivering device,
store the data records in the reversible memory, and
store current hash values from the at least one data record received from the delivering device in the persistent memory, so that, in the persistent memory, a chain of hash values is stored including a current hash value, a predecessor hash value, and a predetermined root hash value; and
the delivering device comprising:
a memory configured to store a private cryptographic key;
a first interface configured to connect to the safekeeping device;
a sensor and/or a second interface configured to connect to a sensor; and
a second logic circuit configured to:
capture measurement values of one or more sensors as the payload data and combine the captured measurement values of the one or more sensors with the predecessor hash value obtained from the safekeeping device, create the current hash value using a combination of the payload data with the predecessor hash value, create a signature of the current hash value with the private cryptographic key, and combine the payload data, the current hash value, the signature, and the predecessor hash value into a data record and transmit the data record to the safekeeping device, wherein the delivering device is a fill level gauge, a limit level gauge, a density meter, a flow meter, or a pressure gauge.

10. The system according to claim 9, wherein the first interface is further configured as a two-conductor line or as a radio link that is limited to a transmit duty cycle of at most 10%.

11. The system according to claim 9, wherein the third interface is configured as a client configured to integrate the safekeeping device as a full participant into a blockchain network serving as the persistent memory.

* * * * *